UNITED STATES PATENT OFFICE 2,465,295

AQUEOUS POLYVINYL ACETATE EMULSION CONTAINING A DICHROMATE OF A TRIVALENT METAL

Frank A. Strauss, Staten Island, N. Y., assignor to American Abrasive Metals Company, Irvington, N. J., a corporation of New York No Drawing. Application January 22, 1945, Serial No. 574,027

10 Claims. (Cl. 260—29.6)

This invention relates to new compositions and their preparation and coatings made therefrom. More particularly, it relates to non-inflammable floor and deck coating compositions adapted for use in making non-slip and non-inflammable floor and deck coatings, particuarly semi-paste compositions of proper consistency for application by trowel in forming floor and deck coatings, and includes the non-slip and non-inflammable floor and deck coatings made therewith, and includes the method of producing such compositions.

The new compositions are polyvinyl acetate emulsion base compositions compounded with stable soluble dichromates of trivalent metals and advantageously also compounded with plasticizers, neutral acid combining agents and wear-resistant solid materials suspended therein, particularly mineral and abrasive particles adapted for producing non-slip coatings when the compositions are used for floor and deck coatings, etc.

The invention also includes such emulsion base compositions which also have compounded therewith oleo-resinous varnishes such as spar varnish of high non-volatile content.

Non-slip coatings have heretofore been employed and proposed in which a resin solution or varnish is compounded with solid materials, usually subdivided mineral matter of varying particle size, the liquid vehicle consisting of a solution of solid or semi-solid resins, plasticizers and oils dissolved in a volatile organic solvent. When such a composition is applied to a surface it dries either through the evaporation of the solvent or by combined evaporation of solvent and oxidation of the non-volatile vehicle. The employment of such coating compositions is accomplished with certain disadvantages, and particularly where relatively thick layers are applied as on deck coatings on shipboard. The volatile solvents are highly inflammable and the application of the coatings is attended with distinct hazards since flames, widely used in shipbuilding operations or on shipboard, may ignite a newly laid surface and envelope a large area in a sheet of flame. Even after such coatings have been in place for some time and superficially appear dry the solvent retaining properties of the thick resinous layers may cause the retention of appreciable quantities of inflammable solvents for considerable periods of time with resulting fire hazard and with prolongation of the time of drying and the development of the full hardness of the coating. With the use of oils and resins which are themselves combustible, they may increase the hazards in case of a serious fire on shipboard where the coating itself may be consumed and add to the fire hazard.

The present invention is based upon the discovery that improved non-slip floor and deck coatings can be made without such fire hazards and that valuable non-inflammable deck coatings can be applied and readily hardened by the use of a composition in which aqueous emulsions of polyvinyl acetate are compounded with dichromates of trivalent metals which have a hardening and insolubilizing effect upon the polyvinyl acetate films and coatings formed from aqueous emulsions thereof; and that improved non-slip and non-inflammable floor and deck coatings can be thereby obtained.

Aqueous emulsions of polyvinyl acetate and their preparation are well known. For example, liquid monomeric vinyl acetate may be emulsified in water in the presence of a protective colloid. The dispersed monomer may then be polymerized by suitable means, for example, by means of a peroxide with or without heating. An example of a protective colloid for use in making such emulsions is polyvinyl alcohol. The preparation of such polyvinyl acetate emulsions is described in United States Patent 2,227,163. Emulsions of this type are white milky liquids, usually slightly acid in reaction and of creamy or watery consistency and commonly contain about 55% of solids although compositions of somewhat higher or lower solids content may readily be prepared. Coatings made with such emulsions have limited water resistance, particularly when exposed to prolonged water immersion.

I have found that the moisture resistance of coatings made with polyvinyl acid emulsions may be greatly increased by the use of dichromates of trivalent elements as insolubilizing agents. I have found that the dichromates of trivalent metals have a hardening and insolubilizing effect on polyvinyl acetate films and coatings deposited from aqueous emulsions which results in particularly valuable coatings from a standpoint of water resistance and other properties. The dichromates of the common metals, aluminum, iron and chromium in their trivalent state are highly effective as insolubilizing agents in rendering dry films of polyvinyl acetate emulsions insoluble. Solutions of the dichromates of these metals may readily be prepared, for example, by dissolving the freshly precipitated hydroxides of these metals in chromic acid solution. Chromic dichromate has been found in some respects more advantageous and it may also be readily prepared by the controlled partial reduction of chromic acid solution. It is not necessary that the dichromate in solution be in pure form. A solution in which the molecular ratio of trivalent metal to hexavalent chromium is approximately 3 to 1 would give satisfactory results. Substantial amounts of other ions or compounds may be present without detracting seriously from the effectiveness of the insolubilizing agents.

While the dichromates of aluminum, iron and chromium are all effective, they differ somewhat in their action. Aluminum dichromate is somewhat less powerful in its action than the dichromates of iron and chromium. Ferric dichromate, while highly effective, renders the emulsion somewhat unstable and tends to exert a coagulating effect on prolonged standing. Chromic dichromate is highly effective and exerts far less coagulating effect upon the polyvinyl acetate emulsion and is in general to be recommended as the most useful of these hardening agents although for special purposes the others may have special advantages. Aluminum dichromate imparts somewhat less color to the dried film than the other compounds. Ferric dichromate may be used where the resin emulsion is to be applied for coating purposes shortly after compounding of the chromate with the emulsion.

The proportions of the dichromates employed as hardening agents may vary over a considerable range depending upon the condition of use and the results desired. As little as 1% or less of the dichromate, based on the resin content of the emulsion, exerts a substantial insolubilizing effect; but increasingly greater effects are obtained when the proportion of dichromate added is increased up to around 10%. Higher amounts can be used but above this proportion the observable improvement in water resistance of the dried resin composition is limited. In general a ratio of about 10% of chromic dichromate as hardening agent on the resin content of the emulsion is to be recommended although larger or smaller amounts can be used with satisfactory results.

The dichromates are advantageously added in the form of aqueous solutions but the concentration of the solution can be varied. The dichromates of the trivalent metals are highly soluble in water and solutions containing 50% or more of the dichromate by weight may readily be prepared. Such concentrated solutions may be added directly to the resin solution or emulsion provided vigorous agitation of the emulsion is maintained. If such solutions are added without adequate stirring local high concentration may tend to cause premature coagulation or clotting. By diluting the dichromate solution with water prior to its addition to the emulsion this risk of coagulation is reduced.

Upon the addition of the dichromate solution to the emulsion a yellow, orange or brownish opaque creamy liquid results. The viscosity of the emulsion is little altered at first but an increase in viscosity gradually occurs resulting in some cases in final coagulation or gelation. The rate of increase of viscosity depends upon a number of factors including the nature and amount of the dichromate used, the character of the resin emulsion and the presence of pigments or loading materials and modifying agents. The degree of viscosity increase can be controlled and coagulation can be avoided by adding neutralizing agents as hereafter described. The thickening of the emulsion by the dichromates of the trivalent metals is desirable and the regulation of this thickening by the use of a neutralizing material enables the thickening effect to be desirably controlled.

When an emulsion to which one of the dichromates described has been added is applied as a coating material to a solid surface and exposed to the air rapid drying takes place and a hard film of resin is formed. By drying the composition at an elevated temperature (up to 120° C.) hardening and insolubilization can be accelerated and intensified. The dry film is brown or almost black in color and is adherent to most surfaces, although somewhat brittle. If such films are allowed to dry at room temperature for a few hours and then immersed in water the effect of the dichromate is highly apparent, on comparison with films prepared from the same resin emulsion containing no hardening agent. The film of the untreated resin swells and softens almost at once while the dichromate-containing film is adversely affected but slowly and slightly.

The hardening action of the dichromate upon the resin appears to be an adsorption phenomenon analogous in some respects to tanning although I do not wish to limit myself by any theoretical explanation of this action. With increased proportion of dichromate a higher concentration of bound dichromate appears to result up to around 10% but apparently with limited increase with increased amount of dichromate above that figure.

As above pointed out, compositions or coatings produced by drying polyvinyl acetate emulsions to which a trivalent dichromate has been added are somewhat brittle in character. Compositions of increased value are prepared by adding plasticizers with resulting increase in the flexibility and resistance of the coating and improvement in the toughness and adhesiveness of the coating. A wide range of non-volatile organic liquid materials have plasticizing action. Examples of useful plasticizers are dibutyl phthalate, tricresyl phosphate, dicarbitol phthalate and ethyl acetyl glycolate. Tricresyl phosphate is particularly advantageous as a plasticizer as it is non-inflammable and contributes to the flame resisting qualities of the coating. Various ester plasticizers such as are suitable for nitrocellulose lacquers can be used with the polyvinyl acetate emulsions in making the new compositions.

The plasticizer may be incorporated with the resin emulsion by a gradual addition of the plasticizer liquid to the emulsion with vigorous stirring. The plasticizer emulsifies readily under these conditions to produce a stable homogeneous mixture. The quantity of plasticizer to be added may be varied in accordance with the degree of flexibility desired and the proportion of pigment or loading materials employed. In general between 15 and 50% plasticizer based on the resin content of the emulsion will give satisfactory results.

As above pointed out, the addition of the dichromate insolubilizing agents to the polyvinyl acetate emulsions tends to increase the viscosity with time. For some purposes this is not disadvantageous particularly when the dichromate hardening agent is added shortly before the composition is used. This tendency toward thickening can be regulated and controlled and a product of improved stability obtained by adding suitable acid accepting or neutralizing substances. I have found that the tendency to increase in viscosity can be controlled or inhibited by controlling and regulating the acidity or hydrogen ion concentration of the emulsion mixture. The initial polyvinyl acetate emulsion is acid in character. The dichromate solutions themselves also have a relatively low pH. If the acidity of the mixture is lowered, i. e., if the pH is raised, the rate of viscosity increase is diminished; and if the pH is close to the neutral point the mixture is substantially stable and little or no subsequent increase in viscosity will occur.

The hydrogen ion concentration of the mixture is advantageously adjusted by the addition of suitable basic or acid neutralizing materials. The neutralizing agents are advantageously neutral compounds and particularly the carbonates of the alkali earth metals. Such compounds as calcium carbonate effectively neutralize the acidity of the emulsion mixture and as they are insoluble in water and generally neutral in character there is no danger of excessive alkalinity of the emulsion or hydrolysis of the polyvinyl acetate. By using an excess of the alkaline earth carbonate over that required to neutralize initial acidity a reserve is provided which automatically maintains the mixture at the correct hydrogen ion concentration. Calcium carbonate or whiting thus serves to combine readily with free acids or acid salts neutralizing them with the evolution of carbon dioxide and any excess will be a neutralizing compound which will continue to serve as an acid neutralizing agent. The inclusion of whiting in the mineral portion of the composition accordingly stabilizes the mixture and prevents excessive bodying and improves the keeping qualities of the composition.

For the production of non-slip coatings the composition has advantageously compounded therewith finely divided non-slip material, particularly finely divided mineral matter of varying particle size and advantageously ingredients of varying particle size and shape. Thus, to secure roughness of texture in the coating, it is desirable to use relatively coarse particles such as fused aluminum oxide commercially known as alundum, irregular in shape and average particle diameter of around 1/13 to 1/8 inch. This results in a rough coating, the abrasive grains of which are resistant to wear. Another advantageous ingredient for imparting roughness and strength is fibrous asbestos having an average fiber length of ½ inch or less. The interlocking fibers of asbestos are useful in promoting the cohesion of the dried coat and in rendering it resistant to chipping or scaling.

The inclusion of pigments of finer particle size is also desirable and advantageous in controlling the consistency of the pasty mass and to impart rigidity and body as well as color to the dried film. A wide variety of fillers are of value such as pulverized silica, clay and calcium carbonate. Materials having varying particle size between 50 and 325 mesh U. S. standard screen sizes may be used. Coloring pigments, including earth colors, chemically precipitated organic colors, toners and lakes may be used to tint the composition to the desired shade. It will be understood that the proportions and type of solid aggregate constituents may be varied widely depending on the effect desired and that the ratio of the aggregate to vehicle may also be varied widely.

In some cases where it is undesirable to have a non-abrasive coating other non-slip constituents may be incorporated such as fine cork particles or cork granules, asbestos fiber, lead wool, etc.; and where a smooth coating is required the coarser particles may be omitted. It is one advantage of the new composition, however, that it can be made of a semi-paste consistency and of regulated thickness so that mineral particles of varying size can be maintained therein in a substantially uniform state of suspension and such that the composition can be readily applied with a trowel.

In compounding the composition where acid accepting or neutralizing substances are used it has been found desirable, in order to obtain the full insolubilizing effect of the dichromate, to add it to the emulsion prior to the addition of the buffering or neutralizing agent. It appears that the insolubilizing or "tanning" action of the dichromate is most effective under acid conditions. If an acid condition is initially present the colloidal particles of the resin are rapidly acted on by the dichromate and at the same time viscosity increase begins to occur. If the buffering or neutralizing agent is then added and the hydrogen ion concentration reduced the tendency for the viscosity to increase is inhibited. In general it is desirable in most cases to withhold addition of the neutralizing agent for periods up to several hours while an increase in viscosity develops and the buffering or neutralizing agent may then be added to stabilize the emulsion. Ordinarily commercial whiting or calcium carbonate is a suitable neutralizing agent as above indicated although other forms of commercially available calcium carbonate or other alkali earth carbonates may be used.

The composition can be further improved by incorporating therein drying oils and oleoresinous varnishes to give emulsion products containing such added materials in addition to the polyvinyl acetate emulsion to which the trivalent dichromates are added. Oleoresinous varnishes of the spar varnish type can readily be incorporated in the composition by emulsification and a marked improvement in the corrosion resistance of the resulting dried film obtained. Gradual addition of the oil or varnish with simultaneous efficient agitation gives stable homogeneous emulsions which can be dried to yield tough, coherent coatings, films, or masses. In addition to their plasticizing action such added materials may contribute to the water resistance of the dried composition particularly when the added material is a water resistant oleoresinous varnish. A spar varnish conforming to Federal specification TT-V-121a but with a reduced content of volatile constituents, e. g., around 80% non-volatile matter. Proportions up to equal parts by weight of the polyvinyl acetate resin solids and varnish solids may be advantageously used. Such compositions dry rapidly initially by the evaporation of the water and volatile solvent present to give tough, tack-free coatings. On exposure to the air further drying by oxidation of the varnish component results whereby additional water-resistance is secured.

When large quantities of varnish containing organic solvents are incorporated in the aqueous emulsion some disadvantage may arise in that the composition is no longer free from volatile inflammable material. But in practice it has been found that the presence of water in the emulsion suppresses the inflammable quality of the solvent and that emulsions containing as much as 25% mineral spirits can be ignited with difficulty if at all. This tendency can be still further reduced by employing as the varnish component a varnish with a low volatile content. It has thus been found practicable to use varnishes containing 20% or less of volatile solvent. When such high solids varnishes are used in proportions up to equal parts of resin solids and varnish solids an emulsion is formed which gives off no inflammable vapor and which cannot be ignited. It is also possible to use as the oleoresinous component of the composition a varnish base containing no volatile solvent provided the varnish base is semi-solid in consistency and mixing is carried out in equipment suitable for incorporating such highly viscous material.

The invention will be further illustrated by the following specific examples illustrative thereof but it is intended and understood that the invention is illustrated thereby but is not limited thereto. The polyvinyl acetate emulsion referred to in the examples was an emulsion of polyvinyl acetate in water containing about 55% solids, the polyvinyl acetate having a viscosity of between 250 and 300 centipoises when measured at 20° C. in a solution of 86 grams of the polyvinyl acetate in 1,000 grams of benzene. The parts are by weight.

*Example 1.*—To 1,000 parts of polyvinyl acetate emulsion containing about 55% solids, is added with constant stirring 200 parts of a 25% ferric dichromate solution. A yellow brown emulsion results which thickens markedly in the course of a few hours and attains a jelly-like consistency in about twenty-four hours. When applied to wood, metal or fabric surfaces in a thin layer prior to coagulation the emulsion dries to a hard, adherent, dark brown but brittle coating. After drying for twenty-four hours the resultant coating is only slightly affected by subsequent prolonged water immersion.

*Example 2.*—The ingredients are used in the following proportions by weight:

| | Parts |
|---|---|
| Polyvinyl acetate emulsion, 55% solids | 400 |
| Dibutyl phthalate | 33 |
| Ferric dichromate, 14% solution | 157.4 |
| Whiting, 325 mesh | 13.8 |
| Asbestos fibre (AAM #3 grade) | 22 |
| Silica flour | 302 |
| Sintered aluminum oxide granules, 40–60 mesh | 275 |

The ingredients are mixed in the order given in a mixer with constant stirring. The dibutyl phthalate plasticizer is added to the resin emulsion gradually over a period of e. g. 15 minutes and the ferric dichromate over a similar period and the solid ingredients then added and incorporated gradually over a period of e. g. 45 minutes. The color pigment dispersion of the above formula was an aqueous dispersion of mineral colors in water containing pigments such as iron oxide.

The composition produced as above showed satisfactory working and drying qualities, impact resistance and wear resistance.

*Example 3.*—To 1,000 parts of polyvinyl acetate emulsion of about 55% solid content is added with constant stirring 165 parts of dibutyl phthalate and there is then added with stirring 220 parts of 25% chromic dichromate solution. The resultant yellow emulsion slowly thickened but remained fluid for a period of several days. When applied to wood, metal or fabric and dried a brown, tough adherent and flexible coating was obtained. By coating cotton fabric with one or more coats a leatherlike finish was obtained. Suitable coloring materials such as iron oxide, etc. may be used to modify the color if desired.

*Example 4.*—To 1,000 parts of polyvinyl acetate emulsion of about 55% solids is added with constant stirring 165 parts of tricresyl phosphate and there is then added with stirring 155 parts of 25% chromic dichromate solution. After standing about 2 hours there is added with stirring 50 parts of whiting, 1,000 parts silica flour, and 100 parts iron oxide pigment. The resultant composition of semi-paste consistency is stable and can be stored for relatively long periods of time. It can be applied by a trowel to horizontal surfaces such as a floor or deck in a layer $\frac{1}{16}$ to $\frac{1}{8}$ inch thick which dries rapidly to a hard, wear-resistant adherent coating. It may be coated on fabric and after drying a flexible product having a leathery surface results.

*Example 5.*—The following composition is used:

| | Parts |
|---|---|
| Polyvinyl acetate, 55% solids | 271 |
| Chromic dichromate, 50% solution | 30 |
| Whiting, 325 mesh | 20 |
| Water | 7 |
| Tricresyl phosphate | 36 |
| Color pigment | 14 |
| Silica flour | 220 |
| Garnet granules, 40–60 mesh | 200 |

The ingredients were mixed as follows: After addition of the chromic dichromate solution to the resin emulsion the whiting prewet with water is added, the tricresyl phosphate then added, and the remaining solid ingredients then added in the order given.

The resultant composition may be applied by trowel to a floor or deck to give a durable moisture-resistant non-slip coating.

*Example 6.*—The following mixture is prepared:

| | Parts |
|---|---|
| Polyvinyl acetate, 55% solids | 182 |
| Spar varnish, 81% solids | 123.5 |
| Tricresyl phosphate | 30 |
| Chromic dichromate, 25% solution | 20 |
| Color pigment | 18 |
| Whiting, 325 mesh | 176 |
| Water | 60 |
| Silica flour | 382 |
| Garnet granules, 40–60 mesh | 352 |
| Water | 40 |

The Spar varnish used in this composition complies with Federal specification TT-V-121a except for its higher non-volatile content and viscosity.

To the resin emulsion in a mixer were added the varnish, tricresyl phosphate and chromic dichromate solution in the order given, a period of e. g. 15 minutes being taken to incorporate the varnish and about 10 minutes for each of the other components. The color pigment dispersion and the whiting prewet with 60 parts of water were next added as rapidly as possible and the remaining solid ingredients were then added in about 40 minutes followed by the balance of the water.

The resulting composition may be used as a deck or floor coating where high resistance to water and weather is required.

In larger scale production of the composition two separate types of mixers are advantageously used and the vehicle ingredients separately premixed and the solids separately prewet and mixed before adding the prewet solids to the premixed vehicle. Thus in a tank provided with a high speed propeller agitator the resin emulsion, plasticizer, varnish and dichromate hardening solution may be mixed together if desired with a portion of the additional water; and the mineral components of the mix may be wet with the balance of the water in a suitable mixer and the required amount of the premixed emulsion then added to the prewet pigment in the mixer and the mass then mixed for a few minutes to give a semi-paste material.

This method of mixing is illustrated by the following example:

*Example 7*

Part I—Premixed Vehicle:

|   | Parts |
|---|---|
| Polyvinyl acetate, 55% solids | 195 |
| Tricresyl phosphate | 32 |
| Chromic dichromate, 50% solution | 22 |
| Spar varnish, 81% solids | 132 |
| Water | 19 |

Part II—Prewet Solids:

|   | Parts |
|---|---|
| Water | 206 |
| Color pigment dispersion | 19 |
| Whiting, 325 mesh | 189 |
| Silica flour, through 75 mesh | 291 |
| Sintered aluminum oxide granules, 40–60 mesh | 95 |
| Silica sand, 40 mesh | 284 |
| Asbestos fibre (AC–101 grade) | 23 |

The ingredients of Part I, the premixed vehicle, are mixed in a cylindrical tank containing a high speed propeller type agitator. To the resin emulsion are added the other ingredients in the order given, about 10 minutes being required for the complete addition. Mixing is then continued for about 30 minutes. The agitator is then stopped and the mixture is allowed to age or mature for a period of from 1½ to 4½ hours. During this maturing operation a certain degree of viscosity is developed.

In mixing the ingredients of Part II the water and color pigment dispersion are placed in a mixer, the mixer started, the other ingredients rapidly added in the order given and the mixing is continued for a period of about 3 minutes.

To effect the final mixture the full amount of the matured Part I vehicle is added to the premixed Part II solids in the mixer tub, the mixer then started, and mixing continued for about 8 minutes, giving a homogeneous mix of satisfactory consistency. The batch is transferred promptly after mixing to suitable containers for shipment and the resulting packages are allowed to stand undisturbed for a few hours during which time a thixotropic structure develops within the mass which inhibits undesired syneresis of thin liquid or sedimentation of coarse particles.

The resulting composition has properties similar to those of the preceding example.

From the foregoing it will be seen that the invention provides improved non-inflammable compositions in which polyvinyl acetate emulsions are given improved water resistant and other properties by the action of the dichromates of trivalent metals and that these compositions can be further improved by incorporating plasticizers and acid-neutralizing agents therewith, particularly neutral agents such as whiting or calcium carbonate; and that non-slip coating compositions containing abrasive and other mineral particles, etc. may be readily formed of semi-paste consistency suitable for applying by trowel to give floor or deck coatings of substantial thickness.

It will further be seen that compositions can be made of regulated consistency suitable for use as waterproof coating compositions and of varying characteristics depending upon the use to which the compositions are to be put.

It will further be seen that the invention provides improved compositions in which oleoresinous varnishes such as spar varnish may be incorporated with a limited amount of organic solvent to form compositions which can be applied and hardened without fire hazard.

When the compositions are applied and hardened through evaporation of water they form desirable non-inflammable coatings. When applied, for example, to decks on shipboard they remove the fire hazard both in applying and drying the compositions and in giving a non-inflammable deck coating which may advantageously be a non-slip coating by incorporating abrasive and other particles therein.

It will be understood that variations and modifications can be made in the application and practice of the invention.

I claim:

1. An aqueous polyvinyl acetate emulsion composition having incorporated therein about 1% to 10%, based on the polyvinyl acetate content of the emulsion, of a water soluble dichromate of a trivalent metal as a hardening agent.

2. An aqueous polyvinyl acetate emulsion composition having incorporated therein about 1% to 10%, based on the polyvinyl acetate content of the emulsion, of a water soluble dichromate of a trivalent metal as a hardening agent together with about 15 to 50%, based on the polyvinyl acetate content of the emulsion, of a plasticizer.

3. An aqueous polyvinyl acetate emulsion composition having incorporated therein about 1% to 10%, based on the polyvinyl acetate content of the emulsion, of a water soluble dichromate of a trivalent metal as a hardening agent together with a substantial amount of neutral acid-neutralizing material.

4. An aqueous polyvinyl acetate emulsion composition having incorporated therein about 1% to 10%, based on the polyvinyl acetate content of the emulsion, of a water soluble dichromate of a trivalent metal as a hardening agent together with about 15 to 50%, based on the polyvinyl acetate content of the emulsion, of a plasticizer and an effective amount of abrasive materials.

5. An aqueous polyvinyl acetate emulsion composition of semi-paste consistency suitable for application by trowel in forming floor and deck coatings, said composition containing about 1% to 10%, based on the polyvinyl acetate content of the emulsion, of a water soluble dichromate of a trivalent metal as a hardening agent, about 15 to 50%, based on the polyvinyl acetate content of the emulsion, of a plasticizer, a substantial amount of neutral acid-neutralizing material and an effective amount of anti-slip material.

6. A coated surface having an adherent water-resistant polyvinyl acetate coating of polyvinyl acetate hardened by about 1% to 10%, based on the polyvinyl acetate content of the emulsion, of a water soluble dichromate of a trivalent metal.

7. The process of producing aqueous polyvinyl acetate compositions which comprises adding to a polyvinyl acetate emulsion about 1% to 10%, based on the polyvinyl acetate content of the emulsion, of a stable, water soluble dichromate of a trivalent metal to effect thickening of the emulsion and then adding a substantial amount of an acid-neutralizing material.

8. The process of producing a stable, aqueous, polyvinyl acetate emulsion drying on evaporation to yield a water-resistant film which comprises adding to an aqueous polyvinyl acetate emulsion an aqueous solution of about 1% to 10%, based on the polyvinyl acetate content of the emulsion, of a water soluble dichromate of a trivalent metal, allowing the mixture to stand for a period of time, and then adding a substantial amount of a neutral acid-neutralizing material.

9. An aqueous polyvinyl acetate emulsion composition having incorporated therein about 1% to 10%, based on the polyvinyl acetate content of the emulsion, of chromic dichromate as a hardening agent.

10. An aqueous polyvinyl acetate emulsion composition of semi-paste consistency suitable for application by trowel in forming floor and deck coatings, said composition containing about 5% to 10%, based on the polyvinyl acetate content of the emulsion, of chromic dichromate as a hardening agent, about 15 to 50%, based on the polyvinyl acetate content of the emulsion, of a plasticizer, a neutral acid-neutralizing material and abrasive material.

FRANK A. STRAUSS.

REFERENCES CITED

The following references are of record in the file of this patent:

UNITED STATES PATENTS

| Number | Name | Date |
| --- | --- | --- |
| 2,111,272 | Paulson | Mar. 15, 1938 |
| 2,346,755 | Hemming | Apr. 18, 1944 |